Patented Jan. 26, 1954

2,667,497

UNITED STATES PATENT OFFICE 2,667,497

PROCESS FOR THE PREPARATION OF CYCLIC CARBONATES

Warren K. Cline, Niagara Falls, N. Y., assignor to Mathieson Chemical Corporation, a corporation of Virginia No Drawing. Application December 12, 1951, Serial No. 261,383

12 Claims. (Cl. 260—340.2)

My invention relates to improvements in the manufacture of alkylene carbonates, particularly ethylene and propylene carbonates, by the reaction of carbon dioxide with an alkylene oxide in the presence of a catalyst.

The reaction of carbon dioxide with alkylene oxides to produce the corresponding alkylene carbonates does not give significant amounts of product in the absence of a catalyst. The use of activated carbon has been proposed as a catalyst. For example, German Patent 740,366 describes yields as high as 90 per cent of ethylene carbonate employing alkali treated activated carbon as catalyst for the reaction of carbon dioxide and ethylene oxide. I have carefully studied this reaction system, and have been unable in a number of repetitions of the described procedure to obtain yields of more than about 10 to 34 per cent.

I have discovered however that the reaction of carbon dioxide with an alkylene oxide to produce the corresponding alkylene carbonate is effectively catalyzed by a solid catalyst representing a halide other than fluoride of magnesium or calcium. Only minor amounts of the catalyst, e. g. about 1 to 2 per cent, need be employed for product recoveries as high as about 85 per cent yield of the desired alkylene carbonate in either a batch reaction system or in a single pass through a continuous reaction system. According to my invention, carbon dioxide is reacted with the alkylene oxide at about 150° to 250° C. and under a pressure of about 500 to 2000 pounds in the presence of the calcium or magnesium halide catalyst. The alkylene carbonate product is recovered from the reaction mixture, advantageously by distillation, which comprises unreacted carbon dioxide, unreacted alkylene oxide, together with a small amount of polyalkylene oxides and the desired product.

The chlorides, bromides and iodides of magnesium and calcium have value as catalysts according to my invention. The useful halides should be employed in dehydrated condition, that is containing less water than the commonly known hydrates. For example commercial fused magnesium chloride of the formula $MgCl_2 \cdot xH_2O$ is suitable. Calcium chloride in substantially anhydrous state is a particularly suitable catalyst. No special precautions however need be taken in handling the catalyst to avoid contact with air. Magnesium sub-iodide prepared by the direct reaction of iodine and magnesium in ether in known ways and recovered from the ether solution is also a useful catalyst. On the other hand I have found that many materials are ineffective in promoting the reaction, for example calcium oxide, activated alumina, silica gel, activated charcoal and mercuric sulfate, and even more closely related materials such as calcium fluoride and barium chloride. Zinc chloride causes a very rapid reaction but the product contains little or no ethylene carbonate. Also to be avoided are materials promoting the polymerization of the alkylene oxide without interaction with carbon dioxide. Some by-product polymer appears to be unavoidably formed even with the best catalysts for the formation of the alkylene carbonate.

The proportion of catalyst employed should be about 0.1 to about 4 per cent by weight of the reactants charged but about 1 to 2 per cent is preferred. When no catalyst is used yields are less than 5 per cent. With 1 per cent of catalyst yields of about 85 per cent are obtainable.

A pressure of about 500 to 2000 pounds or higher is used at a temperature of about 150–250° C. The preferred temperature range however is about 180–210° C. At lower temperatures the reaction is much slower and at higher temperatures larger proportions of high boiling by-products, believed to be polymeric alkylene oxides are formed. The pressure usually rises initially to a maximum within the defined range on heating the reactants. As the batchwise reaction proceeds, the pressure decreases and becomes substantially constant when the reaction is completed.

The time required for the reaction under these conditions of temperature and pressure is usually about ½ to 1 hour but slightly improved yields may be obtained by heating for 2 hours or more. By operation in a continuous reaction system, the reaction time may be considerably reduced without sacrifice in yield. Advantageously a continuous reaction system operating at a reduced conversion level may be employed to improve yield by recovering the unreacted materials and recycling them with the fresh reactants to the reaction zone in order to obtain the desired ultimate conversion.

For best yields, the molar ratio of alkylene oxide to carbon dioxide in the reaction mixture is about 1:1 to about 2:1. With an excess of carbon dioxide, the yield of alkylene carbonate is reduced. When the ratio of alkylene oxide to carbon dioxide is above about 2:1, the reaction is extremely rapid but a larger proportion of polymer is produced.

My invention will be further illustrated by reference to the following examples. Although the examples illustrate the production of ethylene and propylene carbonate, the reaction is applicable to alkylene oxides in general. The process is practically of the greatest importance with ethylene and propylene oxides as starting materials. The examples are not intended to be otherwise limiting wtih respect to procedure of operation, selection of catalysts or operation conditions.

Example I

A stainless steel lined rocking autoclave was charged with 20 parts of fused magnesium chloride, 2068 parts of ethylene oxide and 2138 parts of liquid carbon dioxide. On heating to 190° C. for 135 minutes, a maximum pressure of 1500 p. s. i. g. was developed. After cooling the bomb and venting unreacted gases, the residue was distilled to obtain 3021 parts of ethylene carbonate, a yield of 73%.

Example II

The same autoclave was charged with 1 part of fused magnesium chloride, 40 parts of ethylene oxide and 66 parts of liquid carbon dioxide. The mixture was stirred and heated at 210–215° C. for 50 minutes. The maximum pressure developed was 1700 p. s. i. which dropped to 1020 p. s. i. at the end of the reaction time. Venting of the excess gases and distillation of the product yielded 54.3 parts of ethylene carbonate representing a yield of 67.9%.

Example III

A steel autoclave was charged with 4 parts of anhydrous calcium chloride, 168 parts of ethylene oxide and 228.6 parts of carbon dioxide. The vessel was rocked and heated to 210° C. The pressure rose to 1400 p. s. i. at 192° C. and dropped to 480 p. s. i. at the end of 30 minutes. Distillation of the product yielded 289 parts of colorless crystalline ethylene carbonate boiling at 117–120° C. at 14 mm. This is a yield of 85.4%.

Example IV

A charge of 173 parts of ethylene oxide, 176 of $CO_2$ and 8 parts of anhydrous calcium chloride was rocked in a steel autoclave while heating to 200° C. A maximum pressure of 1000 p. s. i. developed which dropped to 140 p. s. i. in 35 minutes. Distillation of the product gave 251.4 parts of ethylene carbonate amounting to a yield of 72.5%.

Example V

Magnesium sub-iodide was prepared by adding magnesium metal to the theoretical equivalent of iodine dissolved in dry ether to form the compound $MgI$. Ether was removed by evaporation and 4 parts of magnesium sub-iodide was transferred to the autoclave. The vessel was charged with 200 parts of ethylene oxide and 220 parts of solid carbon dioxide, closed and heated to 190–195° C. The pressure rose to 750 p. s. i. and after 30 minutes dropped to less than 50 p. s. i. g. The bomb was cooled, vented and the product distilled. A yield of 227.9 parts of ethylene carbonate boiling at 74–79° C. at 2 mm. was obtained. This represents a yield of 56.9%.

Example VI

A pressure vessel was charged with 174 grams of propylene oxide, 140 grams of carbon dioxide and 3 grams of magnesium sub-iodide prepared as described in the preceding example. The mixture was heated at 172–183° C. for two hours and the product recovered as before. The yield of propylene carbonate was 64%.

Example VII

In a continuous process 55 pounds per hour of ethylene oxide and 83 pounds per hour of carbon dioxide are transferred through a heat exchanger to a reactor maintained at a pressure of 1500 p. s. i. g. and at a temperature of about 175° C. The reactor is tubular and provides a holding time of about 30 minutes. The reactor is packed with anhydrous calcium chloride catalyst. The product passes through a cooler and into a flash drum. Carbon dioxide is removed at a temperature of 122° C. and the bottoms are charged at the rate of about 103 pounds per hour to a continuous vacuum still. Ethylene carbonate is distilled overhead and the condensed product amounts to about 94 pounds per hour. The residue amounts to about 8 pounds per hour of polyethylene glycol by-product.

I claim:

1. A process for manufacturing an alkylene carbonate which comprises reacting carbon dioxide with a lower alkylene oxide at about 150° to 250° C. and under a pressure of about 500 to 2000 pounds per square inch pressure in the presence of a solid catalyst consisting of a halide selected from the group consisting of chlorides, bromides and iodides of an alkaline earth metal selected from the group consisting of calcium and magnesium and recovering the alkylene carbonate from the reaction mixture.

2. The process of claim 1 in which the solid catalyst is a halide selected from the group consisting of chlorides, bromides and iodides of calcium.

3. The process of claim 1 in which the solid catalyst is a halide selected from the group consisting of chlorides, bromides and iodides of magnesium.

4. The process of claim 1 in which the solid catalyst is anhydrous calcium chloride.

5. A process for manufacturing ethylene carbonate which comprises reacting carbon dioxide with ethylene oxide at about 150° to 250° C. and under a pressure of about 500 to 2000 pounds per square inch pressure in the presence of a solid catalyst consisting of a halide selected from the group consisting of chlorides, bromides and iodides of an alkaline earth metal selected from the group consisting of calcium and magnesium and recovering ethylene carbonate from the reaction mixture.

6. The process of claim 5 in which the solid catalyst is a halide selected from the group consisting of chlorides, bromides and iodides of calcium.

7. The process of claim 5 in which the solid catalyst is a halide selected from the group consisting of chlorides, bromides and iodides of magnesium.

8. The process of claim 5 in which the solid catalyst is anhydrous calcium chloride.

9. A process for manufacturing propylene carbonate which comprises reacting carbon dioxide with propylene oxide at about 150° to 250° C. and under a pressure of about 500 to 2000 pounds per square inch pressure in the presence of a solid catalyst consisting of a halide selected from the group consisting of chlorides, bromides and iodides of an alkaline earth metal selected from the group consisting of calcium and magnesium and recovering propylene carbonate from the reaction mixture.

10. The process of claim 9 in which the solid catalyst is a halide selected from the group consisting of chlorides, bromides and iodides of calcium.

11. The process of claim 9 in which the solid catalyst is a halide selected from the group consisting of chlorides, bromides and iodides of magnesium.

12. The process of claim 9 in which the solid catalyst is anhydrous calcium chloride.

WARREN K. CLINE.

References Cited in the file of this patent

UNITED STATES PATENTS

| Number | Name | Date |
|---|---|---|
| 2,518,058 | Pechukas | Aug. 8, 1950 |

FOREIGN PATENTS

| Number | Country | Date |
|---|---|---|
| 740,366 | Germany | Oct. 19, 1943 |